April 2, 1957 J. FRANSEN 2,787,742
MEASURING DEVICE FOR LOW ELECTRIC CURRENTS
Filed Jan. 2, 1953
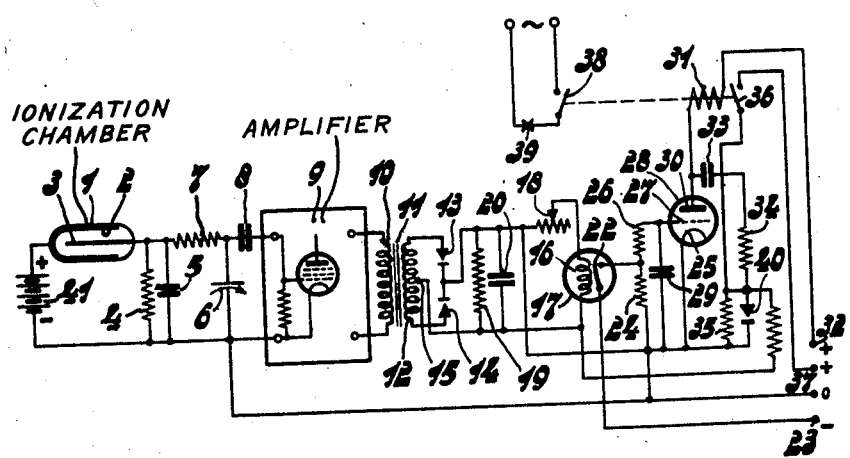
INVENTOR
JACOBUS FRANSEN
BY
AGENT United States Patent Office 2,787,742
Patented Apr. 2, 1957

2,787,742

MEASURING DEVICE FOR LOW ELECTRIC CURRENTS

Jacobus Fransen, Eindhoven, Netherlands, assignor, by mesne assignments, to North American Philips Company, Inc., New York, N. Y., a corporation of Delaware Application January 2, 1953, Serial No. 329,401

Claims priority, application Netherlands January 10, 1952

4 Claims. (Cl. 317—152)

The present invention relates to a circuit arrangement for measuring the intensity of an electric voltage.

When measuring electric voltages and currents the measurement may be required to be terminated on reaching a pointer position of the indicating instrument which corresponds to a predetermined value. In order to avoid the need for continuously inspecting the movement of the pointer use has been made of an indicating instrument comprising a contact device, the movable lever of which is constituted by the pointer, and a second contact which is arranged in a fixed position during measurement. The second contact is designated hereinafter as the stationary contact, although it permits the measuring range to be adjusted by displacement along the graduated scale division of the indicating instrument.

There is a limitation in that the first engagement of the pointer with the stationary contact occurs without any appreciable pressure. At that moment the pointer is inoperative since the electrical torque by which the pointer is driven is exactly equal to the mechanical torque which serves to move the pointer back to the zero position when the electrical torque falls off. A force able to exert sufficient contact pressure is not available.

The contact device may be included in a circuit for indicating the pointer position reached. In a known circuit arrangement for measuring the intensity of X-rays the X-ray apparatus is disconnected by means of a contact device of the said kind. In addition the measuring circuit of the indicating instrument is connected with the indicating circuit and the closure of the contact contained in the measuring circuit produces a current variation such that the contact pressure is increased.

At the first engagement of the pointer with the stationary contact the contact resistance is very high so that substantially no current is passed. It is difficult to indicate the extent to which the contact pressure is required to increase before the current strength is sufficiently high to be used in the said cases. However, the force required to achieve this contact pressure must be supplied from the torque which is responsible for the deflection of the pointer of the indicating instrument. This requires the current in the measuring circuit to differ from the value which corresponds with the indication at the established measuring range, so that there is the disadvantage that the indication is not given at the correct instant.

An object of the present invention is to provide a measuring device which substantially reduces this disadvantage.

According to the invention, in a measuring device for electric voltages and currents which is arranged to indicate a predetermined pointer position of an indicating instrument, the pointer in this position closing an interruption in the grid circuit of an electronic discharge tube, the cathode of the discharge tube is connected to a point of the measuring circuit of the indicating instrument. The anode of the discharge tube is connected by way of a capacity to one end of a resistor, the other end of which is connected to the cathode of the discharge tube, and which is connected at least in part in parallel with the measuring circuit.

The variation of the voltage of the control grid of a discharge tube requires substantially no current. Use may be made of a resistor circuit which may be arranged in a manner such that in spite of the very high contact resistance of the point of contact in the contact operated by the pointer of the indicating instrument after traversing the given measuring range part of the voltage of the direct current source is applied to the control grid. As soon as this is the case the contact pressure is automatically increased independently of changes in the voltage required to be measured.

The invention may be employed in different devices in which the value to be measured is converted into an electric voltage or current, for example, when measuring fluxes of light by means of a photocell amplifier, temperatures by means of a pyrometer and the proportion of X-rays with the use of an ionization chamber.

It is sometimes important that when in use the indicating instrument should extract a minimum of current in order to insure that the difference between the electromotive force of the voltage source and the terminal voltage measured remains a minimum. In other cases, feeble direct currents have been measured by determining the voltage produced by the current passed through a resistor of high resistance. This also requires the use of a voltmeter having a very high resistance, since the meter shunts the measuring resistor and thus provides an uppermost limit for the resistor constituted by the parallel combination of both, the sensitivity of the circuit being thus limited. In the said cases, for measuring the voltage use may be made with advantage of devices operating on the principle of the dynamic electrometer. This is to be understood to mean that with the use of a capacitor, one of the electrodes of which is kept vibrating so that the capacity varies periodically, the direct voltage required to be measured is supplied to an amplifier. The output voltage of the amplifier is rectified and measured by means of a moving coil meter. In such indicating instruments the current is low enough for a low increase of the contact pressure in a contact device, which is operated by the pointer of the instrument, to require even considerable overstepping of the current strength to be indicated.

In a particular embodiment of the measuring device of the present invention it is possible to prevent any variation in the quantity to be measured that reduces the contact pressure from interrupting the short circuit in the circuit controlled by the contact device.

The invention will now be described with reference to the accompanying drawing, in which the single figure is a schematic diagram of a preferred embodiment of the circuit arrangement of the present invention.

The circuit arrangement of the figure serves particularly for measuring X-rays. For this purpose provision is made of an ionization chamber 1 which for undertaking a measurement is arranged in the X-ray beam. The X-rays ionize a definite amount of gas available in the chamber 1 so that the gas becomes slightly conducting. Thus, a current tends to pass between electrodes 2 and 3 which have applied between them a voltage which is sufficiently high to cause the ionization current to assume its saturation value. This purpose is served by a direct current source 41.

The current passes through a resistor 4 and the voltage across said resistor is measured. A capacitor 5 serves for smoothing.

The voltage set up across the resistor 4 is supplied to an electrodynamic vibrator 6 via a resistor 7 of high resistance valve. The vibrator 6 may comprise a capacitor one of the electrodes of which is kept vibrating so that the capacity varies periodically. Produced across the capacitor is an alternating voltage which at a given vibration amplitude is proportional to the unidirectional voltage applied. Said alternating voltage is supplied via a coupling capacitor 8 to an alternating voltage amplifier 9 of usual type.

The output voltage of the amplifier 9 is rectified in order to enable it to be measured by means of a moving coil meter. For this purpose, the output of the amplifier is connected to the primary 10 of a transformer 11 the secondary 12 of which is connected to rectifiers 13 and 14. The secondary 12 has a midpoint tapping 15 which is connected to the coil 16 of an indicating instrument 17. The other end of the coil 16 is connected to a control resistor 18, and by way thereof to the point connecting the two rectifiers 13 and 14. Connected in parallel with the series connection of the meter and the resistor 18 are a resistor 19 and a smoothing capacitor 20.

The meter 17 registers the potential difference across the capacitor 20 and this voltage is directly proportional to the intensity of the current passing through the measuring resistor 4 and hence to the intensity of the X-rays. This voltage may be a measure of the proportion of X-rays. In such case, it is necessary for the measuring resistor 4 to be omitted. The pointer of the meter 17 reaches a definite deflection which permits particulars concerning the radiation to be derived and which must not be overstepped. In the case of a small increase of the deflection the radiation apparatus is generally required to be disconnected and it is possible to use a measuring instrument which comprises a contact device. The pointer serves as a switching lever and a contact which is adapted to be displaced permits contact closure at different deflections of the meter.

The first engagement of the pointer with the stationary contact is very light since the pointer, which occupies a position of equilibrium, is still prevented from exerting any pressure on the point of contact. The contact resistance is very high so that appreciable current is prevented from flowing.

The pointer contact is designated 22 and its movable arm is connected to the negative terminal of a voltage source 23. The stationary contact is connected by a resistor 24 to the cathode 25 and by a resistor 26 to the control grid 27 of an electron discharge tube 28 which may comprise, for example a triode. A capacitor 29 serves for smoothing purposes. The anode 30 of the tube 28 is connected by a relay coil 31 to the positive terminal 32 of an anode voltage source. Connected between the anode 30 and the cathode 25 is a potentiometer comprising a capacitor 33 and resistors 34 and 35.

If the pointer contact 22 of the meter 17 is open, the control grid 27 is at cathode potential and the normal anode current passes through the discharge tube 28. As soon as the pointer makes contact a very slight current variation in the resistor 24 due to the applied negative bias from source 23 is sufficient to reduce the potential of the grid 27. This causes the current passing through the discharge tube 28 to fall off. Reduction of the anode current of the tube 28 increases the voltage at the anode 30 and also the potential of the point connecting the two resistors 34 and 35 of the potentiometer. Said point is connected to the lower end of coil 16 of the measuring instrument, the upper end of coil 16 being connected to the lower terminal of resistor 35, provision being made for the potential increase to vary the current passing through the coil of the measuring instrument in a sense such that the resultant variation of the electrical torque increases the pressure of the pointer on the stationary contact. The contact resistance decreases and the negative voltage at the control grid 27 of the discharge tube 28 increases, whereas the anode current of said tube decreases constantly.

The anode current passing through the tube 28 is used for energizing the relay coil 31 which controls the contact member 36. The anode current finally becomes low enough for the relay coil 31 to be de-energized, due to which the tapping point of the resistors 34 and 35 is connected to the positive terminal 37 of a unidirectional voltage source. The voltage of said unidirectional voltage source permanently amplifies the torque that presses the pointer of the measuring instrument against the stationary contact.

In addition, the relay coil 31 may control a contact device 38 which enables a signalling device 39 to be put into use or the radiation apparatus to be rendered inoperative.

The meter deflection may vary for reasons different from those attributed to the voltage to be measured; for example, by sudden variation of the gain of the amplifier 9 at the instant at which the pointer of the measuring instrument makes contact.

The interference is no source of trouble if it increases the contact pressure; but if it operates in the opposite sense the contact pressure will decrease and the grid circuit of the amplifier may even be interrupted. In such case, the grid potential of the discharge tube 28 increases to cathode potential, the anode current passing through the tube increases, and the resultant decrease of the anode voltage continues by way of the potentiometer 33, 34 and 35 in the measuring circuit of the measuring instrument and acts upon the pointer deflection in the same direction as the interference. In order to render this potential pulse inoperative, the resistor 35 is shunted by a rectifier 40 which prevents the tapping between the resistors 34 and 35 from becoming negative in relation to the cathode. Thus, the deviation of the meter deflection remains restricted to that which results from the occurring interference.

While the invention has been described by means of a specific example and in a specific embodiment, I do not wish to be limited thereto, for obvious modifications will occur to those skilled in the art without departing from the spirit and scope of the invention.

What I claim is:

1. A circuit arrangement for measuring the intensity of an electric voltage comprising an indicating instrument having an actuating element and a pointer movable under the influence of said actuating element to a predetermined position, circuit means for producing an actuating potential having a value as determined by the intensity of said electric voltage, means for applying said actuating potential in a given polarity to said actuating element thereby to deflect said pointer to said predetermined position, an electric discharge device comprising an input electrode and an output electrode, means energized by said pointer at said predetermined position for producing a control signal at said input electrode, means for deriving from said output electrode an auxiliary potential as determined by said control signal, and means for applying said auxiliary potential to said actuating means in said given polarity thereby to maintain said pointer at said predetermined position.

2. A circuit arrangement for measuring the intensity of an electric voltage comprising an indicating instrument having an actuating element and a pointer movable under the influence of said actuating element to a predetermined position, circuit means for producing an actuating potential having a value as determined by the intensity of said electric voltage, means for applying said actuating potential in a given polarity to said actuating element, thereby to deflect said pointer to said predetermined position, said last-mentioned means comprising an alternating current amplifier and a rectifier system coupled thereto, an electric discharge device comprising an input electrode and an output electrode, means energized by said pointer at said predetermined position for producing a negative going impulse control signal at said input electrode, means for deriving from said output electrode a positive impulse auxiliary potential as determined by said control signal, and means for applying said auxiliary potential to said actuating means in said given polarity thereby to maintain said pointer at said predetermined position.

3. A circuit arrangement for measuring the intensity of an electric voltage comprising an indicating instrument having an actuating element and a pointer movable under the influence of said actuating element to a predetermined position, circuit means for producing an actuating potential having a value as determined by the intensity of said electric voltage, means for applying said actuating potential in positive polarity to said actuating element thereby to deflect said pointer to said predetermined position, said last-mentioned means comprising an alternating current amplifier and a rectifier system coupled thereto, an electric discharge device comprising an input electrode and an output electrode, means energized by said pointer at said predetermined position for producing a negative going impulse control signal at said input electrode, means for deriving from said output electrode a positive impulse auxiliary potential as determined by said control signal, and means for applying said auxiliary potential to said actuating means in positive polarity thereby to maintain said pointer at said predetermined position, said last-mentioned means comprising resistive means coupled between said output and input electrodes and means for connecting a portion of said resistive means in parallel with said actuating element.

4. A circuit arrangement as claimed in claim 3, further comprising a unidirectionally conducting element connected in parallel across said portion of said resistive means, said unidirectionally conducting element being connected with a polarity whereby it is rendered non-conductive upon the application of said auxiliary potential to said actuating means in positive polarity.

References Cited in the file of this patent

UNITED STATES PATENTS

| | | |
|---|---|---|
| 2,164,701 | Cohen | July 4, 1939 |
| 2,431,281 | Smith | Nov. 18, 1947 |
| 2,558,670 | Breen | June 26, 1951 |
| 2,573,661 | Deubel | Oct. 30, 1951 |
| 2,575,951 | Gilbert | Nov. 20, 1951 |
| 2,611,808 | Lawrence | Sept. 23, 1952 |
| 2,685,665 | Price | Aug. 3, 1954 |